(12) United States Patent
Xu et al.

(10) Patent No.: US 11,457,393 B2
(45) Date of Patent: Sep. 27, 2022

(54) COMMUNICATION METHOD AND APPARATUS FOR REALIZING SERVICE CONTINUITY

(71) Applicant: ZTE CORPORATION, Shenzhen (CN)

(72) Inventors: Hui Xu, Shenzhen (CN); Yong Lv, Shenzhen (CN); Yaying Wang, Shenzhen (CN); Lin Chen, Shenzhen (CN); Chen Lu, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 16/309,918

(22) PCT Filed: Feb. 9, 2017

(86) PCT No.: PCT/CN2017/073164
§ 371 (c)(1),
(2) Date: Dec. 13, 2018

(87) PCT Pub. No.: WO2017/215275
PCT Pub. Date: Dec. 21, 2017

(65) Prior Publication Data
US 2019/0150056 A1    May 16, 2019

(30) Foreign Application Priority Data

Jun. 17, 2016    (CN) .......................... 201610442547.6

(51) Int. Cl.
*H04W 40/02* (2009.01)
*H04W 40/22* (2009.01)
(Continued)

(52) U.S. Cl.
CPC ........... *H04W 40/02* (2013.01); *H04W 36/03* (2018.08); *H04W 40/22* (2013.01); *H04W 48/18* (2013.01);
(Continued)

(58) Field of Classification Search
CPC ..... H04W 40/02; H04W 76/14; H04W 48/18; H04W 40/22; H04W 88/06; H04W 88/04;
(Continued)

(56) References Cited

U.S. PATENT DOCUMENTS

2006/0159047 A1* 7/2006 Olvera-Hernandez ......................
H04W 36/005
370/331
2012/0220214 A1* 8/2012 Du ........................ H04W 68/00
455/7
(Continued)

FOREIGN PATENT DOCUMENTS

CN     102438297 A    5/2012
CN     103402238 A    11/2013
(Continued)

OTHER PUBLICATIONS

European Patent Office, Extended European Search Report dated Jun. 3, 2019 corresponding to EP Application No. 17812393.1.
(Continued)

*Primary Examiner* — Gregory B Sefcheck
*Assistant Examiner* — Joshua Smith
(74) *Attorney, Agent, or Firm* — Li & Cai Intellectual Property (USA) Office

(57) ABSTRACT

The present disclosure provides a communication method and apparatus for realizing service continuity. The method includes: a remote user equipment autonomously selecting or determining based on a first indication of an access network, a communication path communicating with the
(Continued)

access network; and the remote user equipment using the communication path to communicate with the access network. By means of the present disclosure, the determination of a communication path is realized. Therefore, problems in the relevant art of lacking a method for determining a communication link for a remote user equipment and service continuity are solved, thereby ensuring the service continuity of the remote user equipment, and providing a technological base for realizing communications of wearables.

16 Claims, 7 Drawing Sheets

(51) Int. Cl.
    *H04W 48/18*     (2009.01)
    *H04W 76/14*     (2018.01)
    *H04W 36/00*     (2009.01)
    *H04W 88/04*     (2009.01)
    *H04W 88/06*     (2009.01)
    *H04W 92/10*     (2009.01)
    *H04W 92/18*     (2009.01)

(52) U.S. Cl.
    CPC ........... *H04W 76/14* (2018.02); *H04W 88/04* (2013.01); *H04W 88/06* (2013.01); *H04W 92/10* (2013.01); *H04W 92/18* (2013.01); *Y02D 30/70* (2020.08)

(58) Field of Classification Search
    CPC ..... H04W 36/03; H04W 92/18; H04W 92/10; H04W 16/14; H04W 16/26; Y02D 70/39; Y02D 70/14; Y02D 70/12; Y02D 70/20
    See application file for complete search history.

(56) References Cited

U.S. PATENT DOCUMENTS

| 2014/0185587 A1* | 7/2014 | Jang | H04W 36/0005 370/331 |
|---|---|---|---|
| 2016/0044586 A1* | 2/2016 | Koskinen | H04W 48/16 370/336 |
| 2016/0044613 A1 | 2/2016 | Cai et al. | |
| 2016/0212682 A1* | 7/2016 | Chung | H04W 76/14 |
| 2019/0037463 A1* | 1/2019 | Feng | H04W 36/38 |
| 2019/0045574 A1* | 2/2019 | Feng | H04W 76/27 |

FOREIGN PATENT DOCUMENTS

| CN | 103686859 A | 3/2014 |
|---|---|---|
| WO | 2015090348 A1 | 6/2015 |

OTHER PUBLICATIONS

Fujitsu, "The remote UE access to reply from neighbor cell", 3GPP Draft; R2-153107, vol. RAN WG2, Beijing, China, Aug. 14, 2015, http://www.3gpp.org/ftp/tsg_ran/WG2_RL2/TSGR2_91/Docs/.

ZTE, "Service continuity for Prose-UE-TO-Network replay", 3GPP Draft; R2-152546, vol. RAN WG2, Fukuoka, Japan, May 25, 2015, http://www.3gpp.org/ftp/Meetings_3GPP_SYNC/RAN2/Docs/.

Do-Yun-Kim, et al., "Sepctrum coordination of multi-RAT D2D for JOT service", 2015 International Conference on Information and Communication Technology Convergence, IEEE, Oct. 28, 2015, pp. 671-673, XP032829935.

* cited by examiner

COMMUNICATION METHOD AND APPARATUS FOR REALIZING SERVICE CONTINUITY

CROSS REFERENCE

This application is the 371 application of PCT Application No. PCT/CN2017/073164 filed Feb. 9, 2017, which is based upon and claims priority to Chinese Patent Applications No. 201610442547.6 filed on Jun. 17, 2016, the entire contents thereof are incorporated herein by reference.

TECHNICAL FIELD

The present disclosure relates to the field of communication, and more particularly, to a communication method and apparatus for realizing service continuity.

BACKGROUND

With the development of wireless multimedia services, there are increasing demands for high data rate and user experience, which puts forward higher requirement for the system capacity and coverage of traditional cellular networks. In another aspect, application scenes such as public security, social networking services, short-range data sharing and local advertising services make people gradually increase their demands on knowing and communicating with people or things nearby (Proximity Services). Traditional base station centered cellular networks have obvious limitations in high data rate and support for the proximity services. Under this background, a device-to-device (D2D) technology, which represents the new development direction of future communication technologies, come into being to meet the demands. The application of the D2D technology can reduce the load of the cellular networks, reduce the battery power consumption of user equipments, increase the data rate, and improve the robustness of network infrastructures, and thus can better meet the requirements of the above-mentioned high-data-rate services and proximity services. The existing D2D technology is also called proximity services (ProSe for short), or Sidelink (SL for short).

The D2D technology usually includes a D2D detection technology and a D2D communication technology, wherein the D2D detection technology refers to a technology used to determine whether a first user equipment is in proximity to a second user equipment. Generally, D2D user equipments can detect each other by sending or receiving detection signals/information, and the D2D communication technology refers to a technology by which all or a part of communication data of the D2D user equipments can directly communicate without the network infrastructures.

In another aspect, with the development of requirements for Internet of Everything, the 3rd Generation Partnership Project (3GPP for short) standardizes Machine Type Communication (MTC for short), wherein standardization of an evolved MTC (eMTC for short) of R12 and R13 has been basically completed, whereas the standardization of Narrow Band-Internet of Things (NB-IoT for short) is still in progress. On the basis of supporting low cost, the R13 eMTC increases the support for coverage enhancement and bandwidth limitation. Generally, the RF transceiving capacity of an eMTC user equipment (UE for short) is limited to 1.4 MHz, whereas the RF transceiving bandwidth of an NB-IoT device is limited to 180 kHz. An Evolved Node B (eNB for short) and an eMTC/NB-IoT UE generally achieve the objective of coverage enhancement through repeated data transmission. Considering the low-cost characteristics of the eMTC/NB-IoT devices, generally it is expected to prolong the service life of the eMTC/NB-IoT devices as long as possible. However, coverage enhancement may particularly lead to repeated transmission of data packets, which may rapidly consume the power of the UE. In addition to the eMTC/NB-IoT devices, wearables (wearable devices) also have similar application demands such as low cost, limited bandwidth, and low power consumption, etc.

In the new project of the 3GPP, an enhanced D2D is included, which is mainly aimed at the wearables and Internet of Thing (IOT for short)/Machine Type Communication (MTC for short) applications. The above equipments herein are collectively referred to as remote user equipment. The wearables can communicate with the network through a UE-to-network relay, wherein the wearables may communicate through a PC5 or a Uu interface within an eNB coverage, and at least uplink data use the PC5. FIG. 1 is a schematic diagram of a communication architecture using a UE-to-network relay according to an embodiment of the present disclosure, wherein the communication architecture of the UE-to-network relay is as shown in FIG. 1.

In related technologies, for the various remote user equipments mentioned above, their communication link states may vary with device movement or network load variation, which may result in communication operation failure. However, at present there is no suitable solution to determining a communication link for the remote user equipment (for example, methods for determining a communication link during an initial selection or reselection).

In view of the problems in the relevant art of lacking a method for determining a communication link for the remote user equipment and service continuity, no corresponding technical solution has been provided until now.

This section provides background information related to the present disclosure which is not necessarily prior art.

SUMMARY

Embodiments of the present disclosure provide a communication method and apparatus for realizing service continuity to at least solve problems in the relevant art of lacking a method for determining a communication link for a remote user equipment and service continuity.

According to an embodiment of the present disclosure, there is provided a communication method for realizing service continuity. The method includes: autonomously selecting or determining based on a first indication of an access network, by a remote user equipment, a communication path communicating with the access network; and communicating with the access network by the remote user equipment using the communication path.

Optionally, the communication path includes at least one of: communicating with the access network via a first interface, wherein the first interface is configured to directly connect the remote user equipment to the access network; and communicating with the access network via a second interface, wherein the second interface is configured to connect the remote user equipment to the access network via a relay user equipment.

Optionally, in a case that the communication path includes communicating with the access network via the second interface, the method further includes: autonomously selecting or determining based on a second indication of the access network, by the remote user equipment, a communication technology used for communicating between the remote user equipment and the relay user equipment.

Optionally, the communication technology includes at least one of: a 3GPP-based transmission technology; and a non-3GPP-based transmission technology.

Optionally, the 3GPP-based transmission technology includes: a device-to-device (D2D) technology; and/or the non-3GPP-based transmission technology includes at least one of: a Bluetooth technology, a WLAN/WiFi technology, an IrDA technology, a ZigBee technology, and other wireless communication technologies using an unlicensed frequency spectrum.

Optionally, the autonomously selecting or determining based on a second indication of the access network, by the remote user equipment, a communication technology used for communicating between the remote user equipment and the relay user equipment includes at least one of: transferring, by the remote user equipment, a 3GPP technology originally used by the second interface into a non-3GPP technology for transmission; transferring, by the remote user equipment, a non-3GPP technology originally used by the second interface into a 3GPP technology for transmission; transferring, by the remote user equipment, a 3GPP technology originally used by the second interface into another 3GPP technology for transmission; and transferring, by the remote user equipment, a non-3GPP technology originally used by the second interface into another non-3GPP technology for transmission.

Optionally, the autonomously selecting or determining based on a first indication of an access network, by a remote user equipment, a communication path communicating with the access network includes at least one of: transferring, by the remote user equipment, all or a part of services transmitted originally via the first interface, into the second interface for transmission; transferring, by the remote user equipment, all or a part of services transmitted originally via the second interface, into the first interface for transmission; transferring, by the remote user equipment, all or a part of services transmitted originally via the first interface, into an interface directly connected to a target base station for transmission; and transferring, by the remote user equipment, all or a part of services transmitted originally via the second interface, into an air interface connected to a target relay user equipment for transmission.

Optionally, the relay user equipment includes at least one of: a layer 2 UE-to-network relay or a layer 3 UE-to-network relay.

Optionally, the first interface is a Uu interface; and/or the second interface is an air interface between a remote user equipment and a relay user equipment.

Optionally, the autonomously selecting, by a remote user equipment, a communication path communicating with the access network includes: determining, by the remote user equipment, the communication path communicating with the access network based on at least one of: link quality, quality of service (QoS) demand, power consumption demand, a pre-configured rule, and access network indication information.

Optionally, the pre-configured rule includes at least one of: priority of a communication path; link quality threshold of the communication path; and a resource configuration rule.

Optionally, the pre-configured rule is stored in a universal integrated circuit card (UICC) or a mobility equipment (ME) of the remote user equipment, or is received from the access network via a system broadcast message.

Optionally, the access network indication information is indicative of at least one of: communicating with the access network by simultaneously using a first interface and a second interface, wherein the first interface is configured to directly connect the remote user equipment to the access network, and the second interface is configured to connect the remote user equipment to the access network via a relay user equipment; a service type of communication on the first interface and the second interface, wherein the service type includes one of: QoS of a service, a control plane service, a user plane service, and an uplink or downlink service; priority of the first interface and priority of the second interface; detection resource and/or communication resource of the second interface; and a 3GPP or non-3GPP technology used by the second interface.

Optionally, the remote user equipment includes at least one of: a user equipment (UE), a wearable terminal, and an Internet of Things (IOT)/machine type communication (MTC) terminal.

Optionally, the access network includes a base station.

Optionally, the communicating with the access network by the remote user equipment using the communication path includes at least one of: uplink control plane (CP) communication; uplink user plane (UP) communication; downlink CP communication; and downlink UP communication.

Optionally, the first indication is a system message or a specific instruction indicative of a communication path, wherein the specific instruction includes at least one of: layer 1 signaling, layer 2 signaling, and layer 3 signaling.

Optionally, the second indication is a system message or a specific instruction indicative of a communications technology, wherein the specific instruction includes at least one of: layer 1 signaling, layer 2 signaling, and layer 3 signaling.

Optionally, the first interface and the second interface are of intra-frequency or inter-frequency; and/or the second interface uses a licensed frequency spectrum or an unlicensed frequency spectrum.

Optionally, the remote user equipment is positioned within or beyond a coverage range of the access network, or the remote user equipment is positioned within an enhanced coverage range of the access network; and the relay user equipment is positioned within the coverage range of the access network.

According to another embodiment of the present disclosure, there is provided a communication apparatus for realizing service continuity. The apparatus is positioned in a remote user equipment, and the apparatus includes: a first determining module, configured to autonomously select or determine based on a first indication of an access network, a communication path communicating with the access network; and a communication module, configured to communicate with the access network by using the communication path.

Optionally, the communication path includes: communicating with the access network via a second interface, wherein the second interface is configured to connect the remote user equipment to the access network via a relay user equipment. the apparatus further includes: a second determining module, configured to autonomously select or determine based on a second indication of the access network, a communication technology used for communicating between the remote user equipment and the relay user equipment.

Optionally, the relay user equipment includes at least one of: a layer 2 UE-to-network relay or a layer 3 UE-to-network relay.

Optionally, the remote user equipment includes at least one of: a user equipment (UE), a wearable terminal, and an Internet of Things (IOT)/machine type communication (MTC) terminal.

Optionally, the access network includes a base station.

According to a still another embodiment of the present disclosure, there is further provided a storage medium. The storage medium stores a program code configured to: autonomously select or determine based on a first indication of an access network, by a remote user equipment, a communication path communicating with the access network; and communicate with the access network by the remote user equipment using the communication path.

By means of the present disclosure, the remote user equipment autonomously selects or determines based on an indication of an access network, a communication path communicating with the access network, and communicates with the access network using the determined communication path. In this way, the determination of the communication path is realized. Therefore, problems in the relevant art of lacking a method for determining a communication link for a remote user equipment and service continuity are solved, thereby ensuring the service continuity of the remote user equipment, and providing a technological base for realizing communications of wearables.

This section provides a summary of various implementations or examples of the technology described in the disclosure, and is not a comprehensive disclosure of the full scope or all features of the disclosed technology.

BRIEF DESCRIPTION OF THE DRAWINGS

The accompanying drawings described herein are intended for providing further understanding of the present disclosure, and constituting a part of the present disclosure. The exemplary embodiments of the present disclosure and description thereof are intended for explaining the present disclosure, but not for constituting an improper limitation on the present disclosure. In the drawings.

DETAILED DESCRIPTION

The present disclosure will be described below in detail with reference to the accompanying drawings and in combination with the embodiments. It should also be noted that the embodiments in the present disclosure and the features in the embodiments may be combined with each other on a non-conflict basis.

It should be explained that in the specification, the claims and the foregoing accompanying drawings of the present disclosure, a term (such as a first or a second . . . ) is intended to separate between similar objects but is not intended to describe a specific sequence or precedence order.

In study and practice process of related technologies, it is found that at present following problem exists: UE (remote-UE, hereinafter referred to as r-UE) of wearables/Internet of Things (IOT)/machine type communication (MTC) directly communicates with a network or communicates with the network via a remote user equipment (relay UE, hereinafter referred to as R-UE), and communication operation failure of the r-UE/R-UE may be resulted from communication link state change caused by movement of the r-UE/R-UE or network load variation.

To guarantee service continuity of the r-UE, it is required to solve a problem how to select a communication link and/or communication technology for the r-UE. Based on the above consideration, an embodiment of the present disclosure provides a communication method for realizing service continuity to at least solve at least one of the above problems.

Method Embodiments

Figure 1:
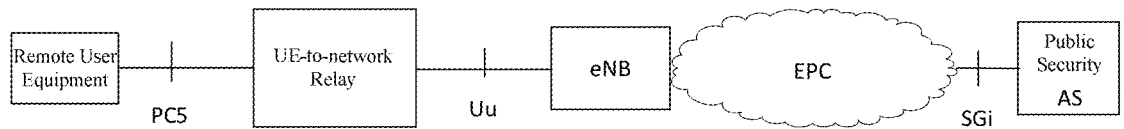
FIG. 1 is a schematic diagram of a communication architecture using a UE-to-network relay according to an embodiment of the present disclosure.
Figure 2:
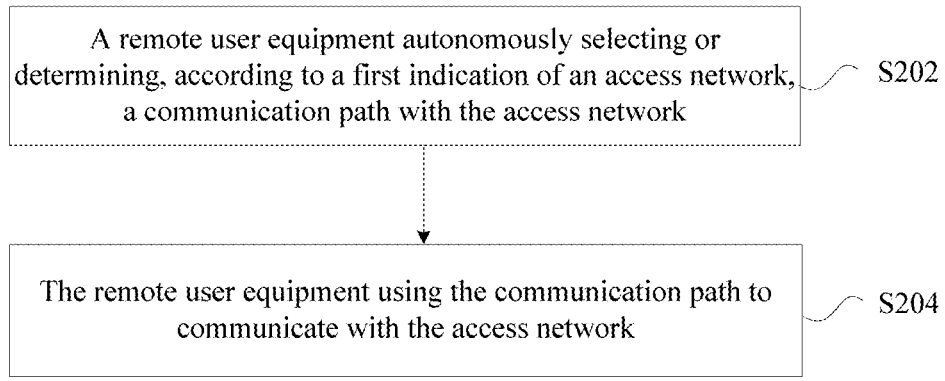
FIG. 2 is a flow diagram of a communication method for realizing service continuity according to an embodiment of the present disclosure.

This embodiment provides a communication method for realizing service continuity. FIG. 2 is a flow diagram of a communication method for realizing service continuity according to an embodiment of the present disclosure. As shown in FIG. 2, the flow includes following steps.

In Step S202, a remote user equipment autonomously selects or determines based on a first indication of an access network, a communication path communicating with the access network.

In Step S204, the remote user equipment communicates with the access network using the communication path.

Through the above steps, the remote user equipment autonomously selects or determines based on an indication of an access network, a communication path communicating with the access network, and communicates with the access network using the determined communication path. In this way, the determination of the communication path is realized. Therefore, problems in the relevant art of lacking a method for determining a communication link for a remote user equipment and service continuity are solved, thereby ensuring the service continuity of the remote user equipment, and providing a technological base for realizing communications of wearables.

The first indication is a system message or a specific instruction indicative of a communication path, wherein the specific instruction includes at least one of: layer 1 signaling, layer 2 signaling, and layer 3 signaling.

Optionally, the r-UE may include, but is not limited to, at least one of: a user equipment (UE), a wearable terminal, and an Internet of Things (IOT)/machine type communication (MTC) terminal. The access network may include, but is not limited to, a base station. Optionally, the r-UE may be positioned within or beyond a coverage range of the access network, or the r-UE may be positioned within an enhanced coverage range of the access network; and the r-UE may be positioned within the coverage range of the access network.

As an embodiment, the communication path may include at least one of:

communicating with the access network via a first interface, wherein the first interface is configured to directly connect the r-UE to the access network, and typically the first interface may be a Uu interface; and communicating with the access network via a second interface, wherein the second interface is configured to connect the r-UE to the access network via a relay user equipment R-UE, and typically the second interface may be an air interface between the r-UE and the R-UE.

Optionally, the first interface and the second interface may be of intra-frequency or inter-frequency; and/or the second interface may use a licensed frequency spectrum or an unlicensed frequency spectrum.

The R-UE may include at least one of: a layer 2 UE-to-network relay or a layer 3 UE-to-network relay.

Optionally, in a case that the communication path includes communicating with the access network via the second interface, the r-UE also may autonomously select or determine based on a second indication of the access network, a communication technology used for communicating between the r-UE and the R-UE For example, the communication technology may include a 3GPP-based transmission technology, and/or a non-3GPP-based transmission technology.

The second indication is a system message or a specific instruction indicative of a communications technology, wherein the specific instruction may include at least one of: layer 1 signaling, layer 2 signaling, and layer 3 signaling.

The 3GPP-based transmission technology may include a device-to-device (D2D) technology (for example, a sidelink technology). The non-3GPP-based transmission technology may include at least one of: a Bluetooth technology, a WLAN/WiFi technology, an Infrared Data Association (IrDA) technology, a ZigBee technology, and other wireless communication technologies using an unlicensed frequency spectrum.

Optionally, scenes where the r-UE autonomously selects or determines based on a second indication of the access network, a communication technology used for communicating between the r-UE and the R-UE may include one or more of:

transferring, by the r-UE, a 3GPP technology originally used by the second interface into a non-3GPP technology for transmission;

transferring, by the r-UE, a non-3GPP technology originally used by the second interface into a 3GPP technology for transmission;

transferring, by the r-UE, a 3GPP technology originally used by the second interface into another 3GPP technology for transmission; and transferring, by the r-UE, a non-3GPP technology originally used by the second interface into another non-3GPP technology for transmission.

Optionally, scenes where the r-UE autonomously selects or determines based on a first indication of the access network, a communication path used for communicating with the access network may include one or more of:

transferring, by the r-UE, all or a part of services transmitted originally via the first interface, into the second interface for transmission;

transferring, by the r-UE, all or a part of services transmitted originally via the second interface, into the first interface for transmission;

transferring, by the r-UE, all or a part of services transmitted originally via the first interface, into an interface directly connected to a target base station for transmission; and transferring, by the r-UE, all or a part of services transmitted originally via the second interface, into an air interface connected to a target R-UE for transmission.

As an embodiment, in Step S202, the r-UE may determine the communication path communicating with the access network based on at least one of: link quality, quality of service (QoS) demand, power consumption demand, a pre-configured rule, and access network indication information. The pre-configured rule may include at least one of: priority of a communication path; link quality threshold of the communication path; and a resource configuration rule.

Optionally, the pre-configured rule may be stored in a universal integrated circuit card (UICC) or a mobility equipment (ME) of the r-UE, or may be received from the access network via a system broadcast message.

Optionally, the access network indication information may be indicative of at least one of:

communicating with the access network by simultaneously using a first interface and a second interface, wherein the first interface is configured to directly connect the r-UE to the access network, and the second interface is configured to connect the r-UE to the access network via a relay user equipment R-UE;

a service type of communication on the first interface and the second interface, wherein the service type comprises one of: QoS of a service, a control plane service, a user plane service, and an uplink or downlink service;

priority of the first interface and priority of the second interface;

detection resource and/or communication resource of the second interface; and a 3GPP or non-3GPP technology used by the second interface, etc.

As an embodiment, the communicating with the access network by the r-UE using the communication path includes at least one of: uplink control plane (CP) communication; uplink user plane (UP) communication; downlink CP communication; and downlink UP communication.

It can be known from the description of the foregoing implementation manners, a person skilled in the art may clearly know that the method of the foregoing embodiments may be implemented by means of software and necessary general hardware platform or of course by means of hardware, but in most cases the former is the better implementation manner. Based on such an understanding, the technical solution of the present disclosure in essence or that part of contribution to the prior art may be embodied in the form of software products, which may be stored in storage media (such as ROM/RAM, diskettes or optical disks), including some instructions so that it is possible to execute the method as recited in the embodiments of the present disclosure by a terminal device (a mobile phone, a computer, a server, or a network device, etc.).

Reference is made below in combination with embodiments, and the following embodiments combine the above embodiments and embodiments thereof.

Figure 3:
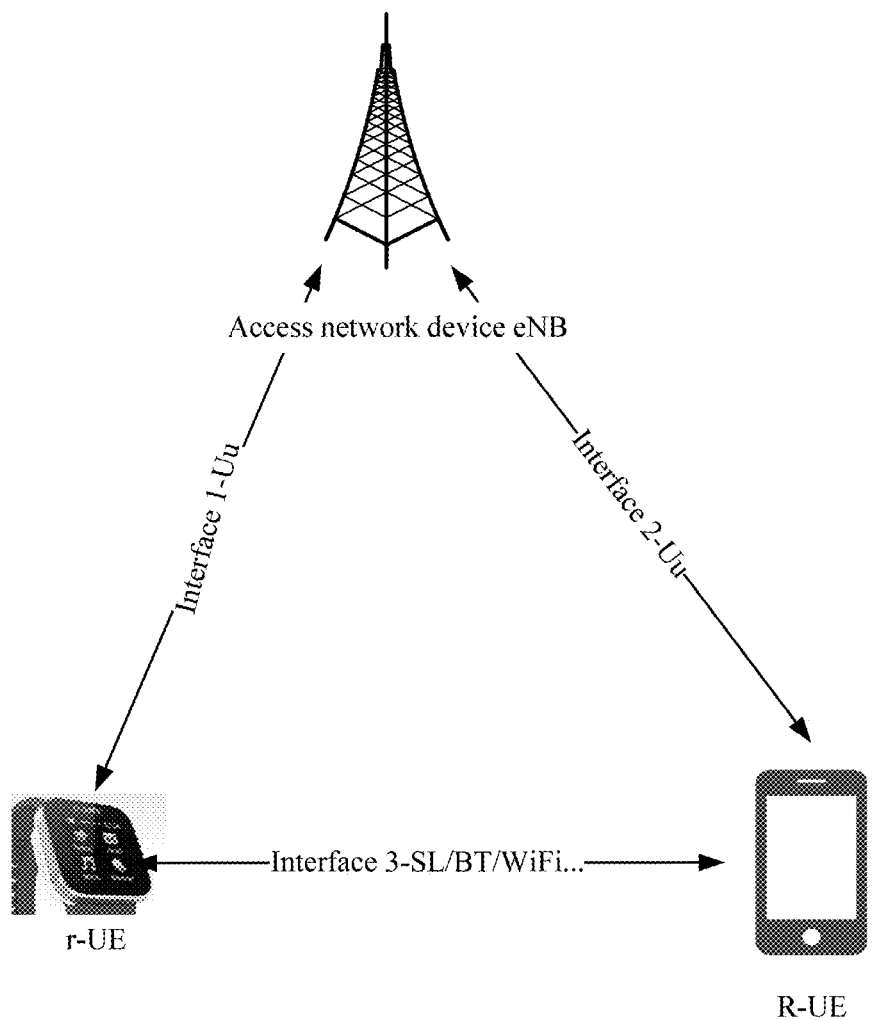
FIG. 3 is a schematic architecture diagram of communicating by a remote user equipment via a relay user equipment according to an embodiment of the present disclosure.
Figure 4A:
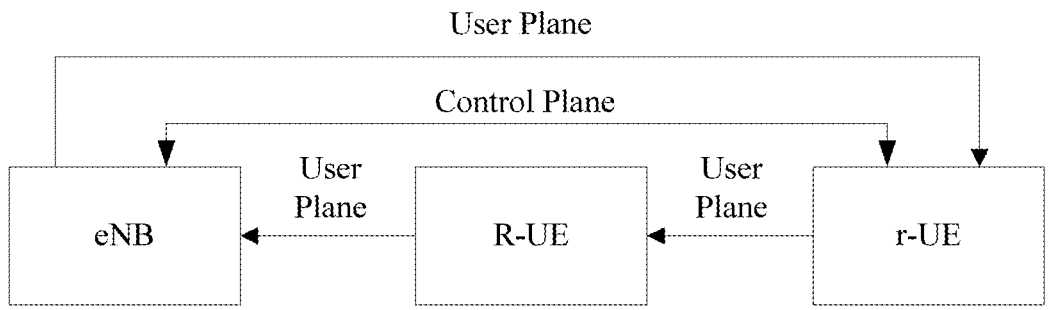
FIG. 4a is an example diagram of implementation scene 1 according to an embodiment of the present disclosure.
Figure 4B:
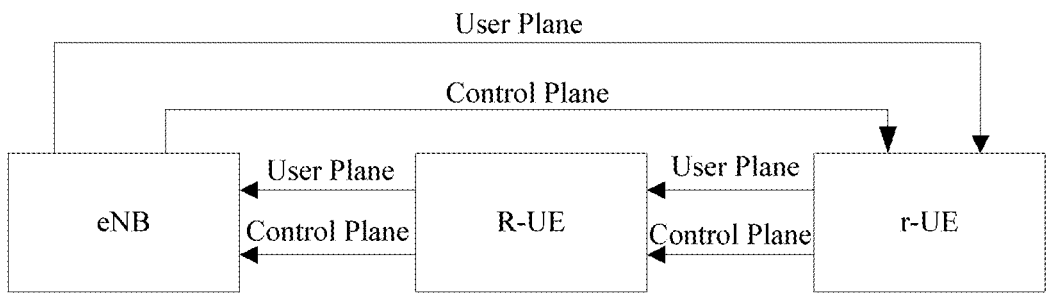
FIG. 4b is an example diagram of implementation scene 2 according to an embodiment of the present disclosure.
Figure 4C:
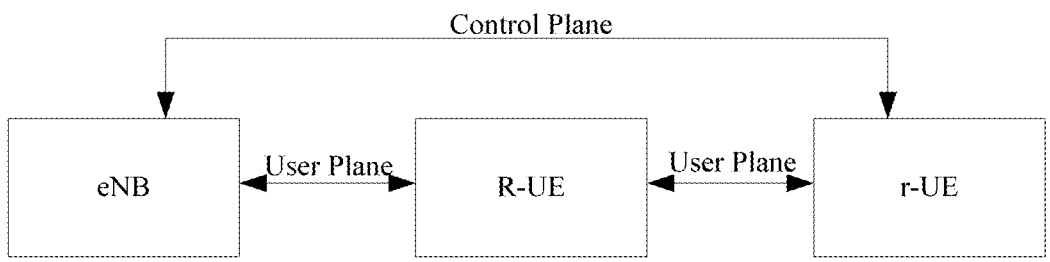
FIG. 4c is an example diagram of implementation scene 3 according to an embodiment of the present disclosure.
Figure 4D:
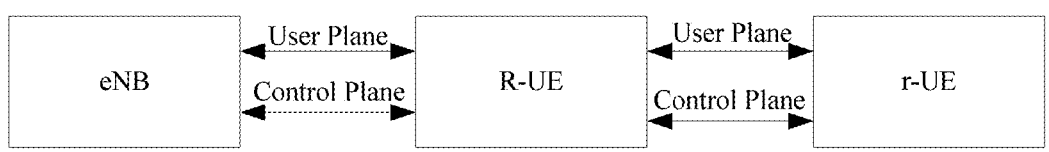
FIG. 4d is an example diagram of implementation scene 4 according to an embodiment of the present disclosure.

FIG. 3 is a schematic architecture diagram of communicating by an r-UE via an R-UE according to an embodiment of the present disclosure. As shown in FIG. 3, a network structure communicating by the r-UE via the R-UE is provided. The network structure includes an r-UE apparatus, an R-UE apparatus, and an access network apparatus. The r-UE apparatus may include at least one of: a user equipment (UE), wearables, an IOT/MTC terminal (such as a category M1/category NB-IOT device). Unless otherwise specified, the r-UE in this embodiment represents one or more of the above terminal apparatuses. It is to be noted that the solution in this embodiment may be applicable to various types of UEs. The r-UE selects based on indication information sent from the access network apparatus or autonomously selects a communication path (an air interface link between the r-UE and the R-UE, or a Uu link between the r-UE and the access network apparatus). Further, the r-UE selects based on the indication information sent from the access network apparatus or autonomously selects a communication technology used by a link between the r-UE and the R-UE, wherein the link between the r-UE and the R-UE may use a 3GPP LTE-based transmission technology (a D2D communication technology such as a sidelink technology), or a non3GPP-based transmission technology (such as a Bluetooth technology, a WLAN technology, or an infrared technology, and so on).

The R-UE apparatus may include at least one of: a relay, wherein the R-UE apparatus is configured to transfer control plane and/or user plane information between the access network apparatus and the r-UE apparatus, the R-UE is a layer 2 or layer 3 relay. Communication between the R-UE and the r-UE may be implemented by at least one of: sidelink, Bluetooth, WLAN/WiFi, IrDA (infrared data association), ZigBee, and other wireless communication technologies using an unlicensed frequency spectrum.

The access network apparatus at least includes an eNB. The eNB is mainly configured to send information to the r-UE apparatus and/or the R-UE apparatus, and receive information sent from the r-UE apparatus and/or the R-UE apparatus.

This embodiment also describes a method for realizing r-UE service continuity by using the above apparatuses. the method specifically includes: autonomously selecting or determining based on an indication of an access network, by the r-UE, a communication path communicating with the access network; and autonomously selecting or determining based on the indication of the access network, by the r-UE, a communication technology used for communicating between the r-UE and the R-UE.

The r-UE is positioned within or beyond a coverage range of the access network, and further, the r-UE is positioned within an enhanced coverage range. The r-UE receives, via a Uu interface, a system message, a synchronization signal or an paging message and so on sent from the access network. To save power consumption, uplink user plane data of the r-UE may be transmitted by the R-UE.

The autonomous selection means that the UE selects an interface 1 or an interface 3 (and an interface 2) in FIG. 3 based on a pre-configured rule to communicate with the access network, wherein the interface 1 in FIG. 3 is the first interface as mentioned above, and the interface 3 in FIG. 3 is the second interface as mentioned above. For ease of understanding, the interface 1 and the interface 3 are described hereinafter. The pre-configured rule is stored in a universal integrated circuit card (UICC) or a mobility equipment (ME) of the UE, or is sent by the access network eNB via a system broadcast message.

The communication path may include an interface 1, an interface 3, uplink and downlink. The communication includes control plane (CP) service and/or user plane (UP) service communication.

The autonomous selection of a communications link caused by r-UE and/or R-UE movement or network load variation may include one of following scenes:

1) transferring, by the r-UE, all or a part of services (including user plane and/or control plane data, uplink and/or downlink) transmitted originally via the interface 1, into the interface 3 for transmission;

2) transferring, by the r-UE, all or a part of services (including user plane and/or control plane data, uplink and/or downlink) transmitted originally via the interface 3, into the interface 1 for transmission; wherein the interface 3 may use a 3 GPP technology or a non-3GPP technology;

3) transferring, by the r-UE, all or a part of services (including user plane and/or control plane data, uplink and/or downlink) transmitted originally via the interface 1, into a new interface 1 (connected to a new cell, i.e., an interface connected to a target base station, similarly hereinafter) for transmission; and 4) transferring, by the r-UE, all or a part of services (including user plane and/or control plane data, uplink and/or downlink) transmitted originally via the interface 3, into a new interface 3 (connected to a new relay, i.e., an air interface connected to a target R-UE, similarly hereinafter) for transmission.

Subsequent description of this embodiment is mainly with respect to the above scene 1) and scene 2). For the scene 3), the service continuity may be implemented by using an existing cell reselection or handover technology. For the scene 4), if the interface 3 uses a sidelink transmission technology, the service continuity may be implemented by using an existing relay selection/reselection technology. If the interface 3 uses a non-3GPP technology, the service continuity may be implemented by using related technologies or enhancements.

Autonomously selecting a communication technology for the interface 3 between the r-UE and the R-UE may include one of following scenes:

1) the interface 3 originally uses the 3GPP technology (the D2D communication technology such as sidelink) for transmission, and needs to transfer to the non-3GPP technology for transmission;

2) the interface 3 originally uses the non-3GPP technology for transmission, and needs to transfer to the 3GPP technology for transmission;

3) the interface 3 originally uses the non-3GPP technology for transmission, and needs to transfer to another non-3GPP technology for transmission; and 4) the interface 3 originally uses the 3GPP technology (the D2D communication technology such as sidelink) for transmission, and needs to transfer to a new interface 3 for transmission by using the 3GPP technology or the non-3GPP technology.

It is to be noted that the above scenes do not exclude a fact that a part of services in the interface 3 use the 3GPP technology, and another part of services in the interface 3 use the non-3GPP technology.

FIG. 4a-FIG. 4d respectively are example diagrams of various implementation scenes according to embodiments of the present disclosure. As shown in FIG. 4, the user plane refers to a user plane data transmission path, and the control plane refers to a control plane data transmission path. It is to be noted that the uplink user plane communication of the r-UE is carried out by the R-UE. However, this embodiment does not exclude a scene where the uplink user plane communication of the r-UE also may be carried out by the interface 1.

The r-UE determines, based on one of link quality, quality of service (QoS) demand, power consumption demand, a pre-configured rule, and eNB indication information, to determine a required communication path.

The pre-configured rule may include at least one of a priority and a threshold. The priority refers to the priority between the interface 1 and the interface 3. The interface 1 is preferentially selected if the interface 1 has a higher priority. The threshold refers to link quality requirements of the interface 1 and/or the interface 3. If the link quality of the current interface is lower than the specified threshold, the UE may select other interfaces or other communication technologies to continue communicating. The UE may notify the access network equipment if the UE selects other interfaces or other communication technologies. Further, the pre-configured rule may further include resource configuration.

The indication of the access network may be information, sent by access network equipment via a system message or a specific instruction, indicative of a communication path and/or a communication technology, wherein the specific instruction includes at least one of: layer 1 signaling, layer 2 signaling, and layer 3 signaling. Further, the indication of the access network may further include one of: communicating simultaneously by using the interface 1 and the interface 3, a service type of communication on the interface 1 and the interface 3, priority of the interface 1 and priority of the interface 3, detection resource and/or communication resource of the interface 3, and a 3GPP or non-3GPP technology used by the interface 3. The service type may include one of: QoS of a service, a control plane service, a user plane service, and an uplink or downlink service.

The R-UE may be a UE-to-network relay.

The interface 1 and the interface 3 may be of intra-frequency or inter-frequency, and the interface 3 uses a licensed frequency spectrum or an unlicensed frequency spectrum.

The communication technology used by the interface 3 between the r-UE and the R-UE may include one of: a sidelink technology, a Bluetooth technology, a WLAN technology, an IrDA technology, a ZigBee technology, and other wireless communication technologies using an unlicensed frequency spectrum.

Based on the above introduction, concrete implementation steps of this embodiment include:

In Step 1, the r-UE communicates with the access network.

The r-UE communicates with the access network eNB via a path in FIG. 3.

In Step 2, it is determined whether to select a new communication path or a communication technology; and it is went to Step 3 if the determination result is yes; otherwise it is wen to Step 4.

The determining by the r-UE, or the R-UE or the eNB specifically may include: determining by the r-UE when the r-UE is in an idle state; determining by the R-UE based on a link state of the interface 1 and/or the interface 2 and/or the interface 3 and on an eNB indication when the R-UE is in a connection state; and determining by the eNB based on reported information of the r-UE and/or the R-UE, a local strategy, and radio resource management (RRM), etc.

Priority orders of determination results of the three nodes are as below: eNB, R-UE, and r-UE. That is, when a plurality of results simultaneously exist, priority is first given to the eNB, then the R-UE, and last the r-UE. Further, if the r-UE or the R-UE determines a result, the r-UE or the R-UE sends result indication information to the eNB, and the eNB determines to accept or refuse the determination result of the r-UE or the R-UE. Further, when the r-UE autonomously selects, the r-UE may not inform the eNB.

The determination is performed based one of following parameters: link quality, quality of service (QoS) demand, a pre-configured rule, and access network indication information. For example, it may be determined to select a new link or technology when the current link quality is lower than a pre-configured threshold, and/or the current link does not satisfy QoS required for a service, and/or a reselection link condition indicated by the pre-configured rule is satisfied, and/or the access network indicates reselection/handover. Otherwise, no new link or technology is selected.

The communication path includes one of an interface 1, an interface 3, uplink UL, and downlink DL. The communication includes one of a user plane and a control plane. Further, the communication path further includes a new R-UE or a new cell selected by the r-UE.

The communication technology refers to a communication technology used by the interface 3, including one of a 3GPP technology and a non-3GPP technology. The 3GPP technology includes: a device-to-device (D2D) communication technology such as a sidelink communication technology. The non-3GPP technology includes one of: a Bluetooth technology, a WLAN technology, an IrDA technology, a ZigBee technology, and other wireless communication technologies using an unlicensed frequency spectrum.

In Step 3, the r-UE selects a new path and/or a technology to communicate.

The r-UE autonomously selects or selects based on an indication of an eNB, a new path and/or technology. The r-UE may select the new path or technology when the r-UE is positioned beyond the coverage range of the eNB or when the r-UE uses an autonomous selection. It is to be noticed that the r-UE cannot select the interface 1 if the r-UE is positioned beyond the coverage range of the eNB; and if the r-UE selects the non-3GPP technology, the R-UE needs to support the selected technology and satisfy specified conditions of the selected technology.

In Step 4, the r-UE continues communicating on the original path.

The r-UE does not need to update the path and/or the technology, and continues communicating on the original path and/or communicates by using the original technology. The continuing communicating on the original path further includes: the r-UE selecting a new path and/or a new technology, but the eNB and/or the R-UE refusing a new selection, and the r-UE continuing using the original path.

The above embodiment is described below with reference to specific situations.

Embodiment 1

This embodiment mainly describes following scene: the r-UE communicates via the interface 1, and transfers to the interface 3 to communicate.

Figure 5:
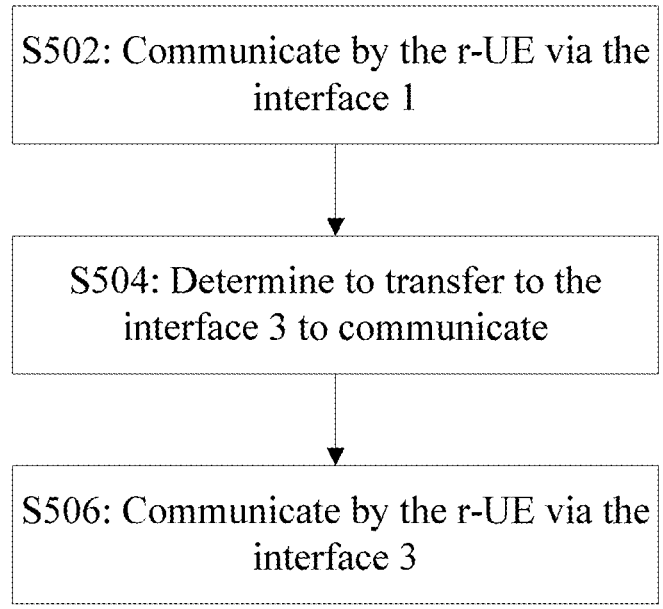
FIG. 5 is a schematic flow diagram of a method according to an embodiment 1 of the present disclosure.

This embodiment provides a method for realizing service continuity. Referring to FIG. 5, a schematic flow diagram of the method according to the embodiment 1 of the present disclosure is illustrated. As shown in FIG. 5, the flow specifically includes following steps.

Step S502: communicating by the r-UE via the interface 1.

The communicating by the r-UE via the interface 1 includes one of: downlink control plane (CP) communication and downlink user plane (UP) communication, downlink UP and uplink and downlink CP communications, and uplink and downlink CP communications. As shown in the scenes 1, 2 and 3 in FIG. 4, the uplink UP communication of the r-UE is carried out by the R-UE.

It is to be noticed that the communicating by the r-UE via the interface 1 does not exclude: communicating by the r-UE via the interface 3.

Step S504: determining to transfer to the interface 3 to communicate.

The determination is carried out by one of the r-UE, the R-UE and the eNB. The transferring to the interface 3 includes one of: downlink CP communication and/or downlink UP communication, downlink UP communication and/or uplink and downlink CP communications, and uplink and downlink CP communications.

Further, the transferring to the interface 3 also includes: the r-UE selecting or the original eNB indicating a new eNB (i.e, a new interface 1).

Step S506: communicating by the r-UE via the interface 3.

The r-UE may use the 3GPP technology or the non-3GPP technology to communicate via the interface 3. The r-UE also needs to select the R-UE before communicating via the interface 3. If the r-UE uses the 3GPP technology via the interface 3, the r-UE makes a selection using a rule of an existing UE-to-network relay. Otherwise, the r-UE makes a selection based on the pre-configured rule or an eNB indication. The resource configuration of the interface 3 may be performed based on an existing rule, or may be pre-configured in the UICC or ME of the r-UE, or may be configured by the eNB based on a request of the r-UE.

Embodiment 2

This embodiment mainly describes following scene: the UE communicates via the interface 3, and transfers to the interface 1 to communicate.

Figure 6:
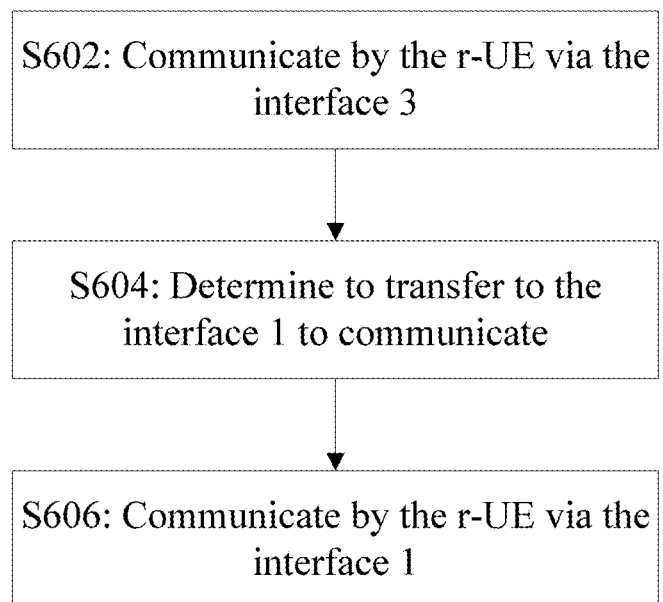
FIG. 6 is a schematic flow diagram of a method according to an embodiment 2 of the present disclosure.

FIG. 6 is a schematic flow diagram of a method according to the embodiment 2 of the present disclosure. As shown in FIG. 6, the flow specifically includes following steps.

Step S602: communicating by the r-UE via the interface 3.

The communicating by the r-UE via the interface 3 includes one of: uplink user plane (UP) communication, uplink control plane (CP) communication and uplink UP communication, uplink and downlink UP communications, uplink and downlink CP communications, and uplink and downlink UP communications, as shown in the scenes 1, 2 and 2 in FIG. 4.

It is to be noticed that the communicating by the r-UE via the interface 3 does not exclude: communicating by the r-UE via the interface 1.

Step S604: determining to transfer to the interface 1 to communicate.

The determination is carried out by one of the r-UE, the R-UE and the eNB. The transferring to the interface 1 includes one of: uplink and downlink CP communications, and downlink UP communication. It is to be noticed that the uplink UP communication of the r-UE is carried out via the interface 3, but it is not excluded that the r-UE also may carry out the uplink UP communication via the interface 1.

Further, the transferring to the interface 1 also includes: the r-UE selecting or the eNB indicating to select a new R-UE (a new interface 3).

Step S606: communicating by the r-UE via the interface 1.

Communication resources of the interface 1 are configured by the eNB. The eNB configuration may be implemented by sending a request message by the r-UE to the eNB (via the R-UE), and the eNB sends a response message and wireless communication resources of the interface 1.

Embodiment 3

This embodiment mainly describes following scene: the r-UE communicates via the interface 3 based on the 3GPP technology, and transfers to other non-3GPP technologies to communicate.

Figure 7:
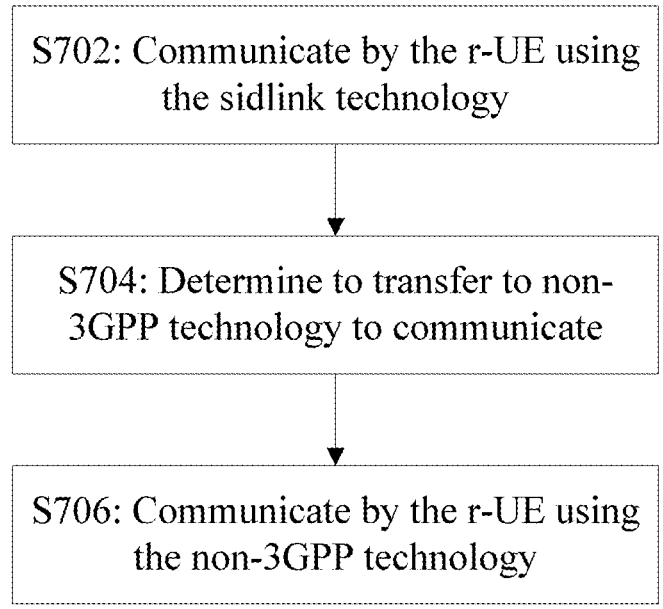
FIG. 7 is a schematic flow diagram of a method according to an embodiment 3 of the present disclosure.

FIG. 7 is a schematic flow diagram of a method according to the embodiment 3 of the present disclosure. As shown in FIG. 7, the flow specifically includes following steps.

Step S702: communicating by the r-UE using the D2D communication technology.

The communicating by the r-UE via the interface 3 includes one of: uplink user plane (UP) communication, uplink control plane (CP) communication and uplink UP communication, uplink and downlink UP communications, uplink and downlink CP communications, and uplink and downlink UP communications, as shown in the scenes 1, 2 and 2 in FIG. 4.

It is to be noticed that the communicating by the r-UE via the interface 3 does not exclude: communicating by the r-UE via the interface 1.

Step S704: determining to transfer to other non-3GPP technologies to communicate.

The determination is carried out by one of the r-UE, the R-UE and the eNB. The non-3GPP technology may include one of: a Bluetooth technology, a WLAN technology, an IrDA technology, a ZigBee technology, and other wireless communication technologies using an unlicensed frequency spectrum.

Step S706: communicating by the r-UE using the non-3GPP technology.

The non-3GPP technology may be borne by using the unlicensed frequency spectrum. If the unlicensed frequency spectrum is used, the corresponding radio resources are autonomously selected by the r-UE based on corresponding technical rules or are coordinated by a network element at network side.

Embodiment 4

This embodiment mainly describes following scene: the r-UE communicates via the interface 3 based on the non-3GPP technology, and transfers to the 3GPP technology to communicate.

Figure 8:
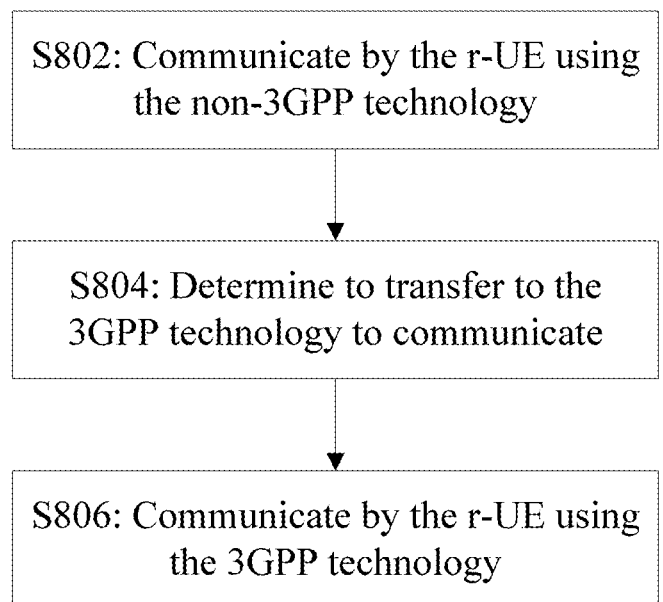
FIG. 8 is a schematic flow diagram of a method according to an embodiment 4 of the present disclosure.

FIG. 8 is a schematic flow diagram of a method according to the embodiment 4 of the present disclosure. As shown in FIG. 8, the flow specifically includes following steps.

Step S802: communicating by the r-UE using the non-3GPP technology.

The non-3GPP technology may include one of: a Bluetooth technology, a WLAN technology, an IrDA technology, a ZigBee technology, and other wireless communication technologies using an unlicensed frequency spectrum.

Step S804: determining to transfer to the 3GPP technology to communicate.

The determination is carried out by one of the r-UE, the R-UE and the eNB. The 3GPP technology is a D2D communication technology such as sidelink.

Step S806: communicating by the r-UE using the 3GPP technology.

The radio resources of the 3GPP technology are autonomously selected by the r-UE or are configured by the eNB/R-UE. The radio resources being autonomously selected by the r-UE refers to a fact that the resources are pre-configured and stored in the UICC or the ME, or are sent by the eNB by means of a broadcast message, such that the r-UE selects the required communication resources from the pre-configured resources or the broadcast indication resources.

Embodiment 5

This embodiment mainly describes following scene: the r-UE communicates via the interface 3, and transfers to a new interface 3 to communicate.

Figure 9:
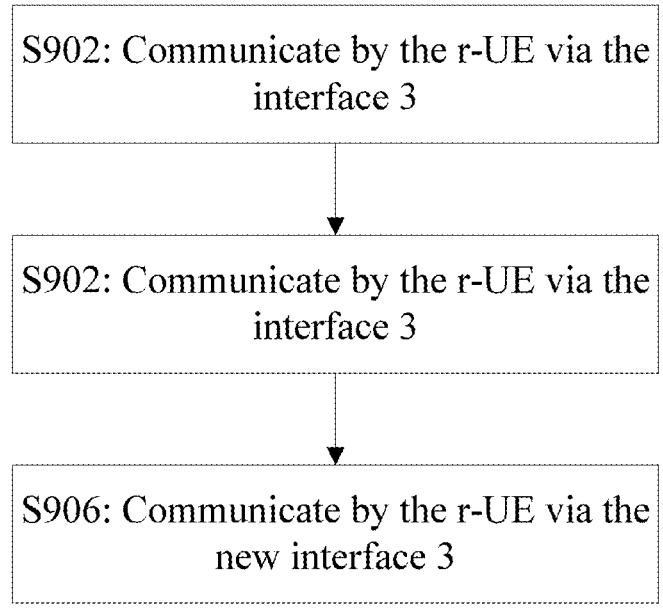
FIG. 9 is a schematic flow diagram of a method according to an embodiment 5 of the present disclosure.

FIG. 9 is a schematic flow diagram of a method according to the embodiment 5 of the present disclosure. As shown in FIG. 9, the flow specifically includes following steps.

Step S902: communicating by the r-UE via the interface 3.

The communicating by the r-UE via the interface 3 includes one of: uplink user plane (UP) communication, uplink control plane (CP) communication and uplink UP communication, uplink and downlink UP communications, uplink and downlink CP communications, and uplink and downlink UP communications, as shown in the scenes 1, 2 and 2 in FIG. 4.

The r-UE communicates via the interface 3 by using the 3GPP technology or the non-3GPP technology.

It is to be noticed that the communicating by the r-UE via the interface 3 does not exclude: communicating by the r-UE via the interface 1.

Step S904: determining to transfer to a new interface 3 to communicate.

The determination is carried out by one of the r-UE, the R-UE and the eNB. The transferring to a new interface 3 includes one of: uplink UP communication, uplink CP communication and uplink UP communication, uplink and downlink UP communications, and uplink and downlink CP communications and uplink and downlink UP communications.

Step S906: communicating by the r-UE via the new interface 3.

When the new interface 3 uses the 3GPP technology, the communication resources are autonomously selected by the UE or are configured by the eNB. When the new interface 3 uses the non-3GPP technology, the communication resources are autonomously selected by the r-UE or are coordinated by a network side (the R-UE and/or the eNB).

Embodiment 6

Figure 10:
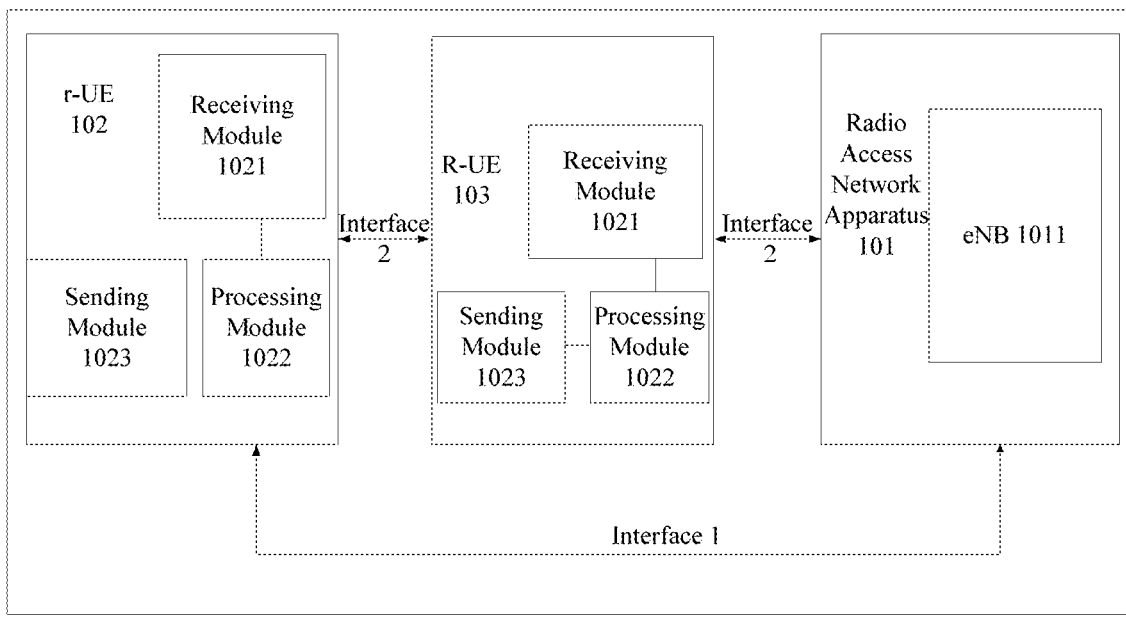
FIG. 10 is a schematic structural diagram of a system for realizing service continuity according to an embodiment 6 of the present disclosure.

This embodiment mainly describes a system for realizing service continuity. FIG. 10 is a schematic structural diagram of the system for realizing service continuity according to the embodiment 6 of the present disclosure. As shown in FIG. 10, this system includes: a radio access network apparatus 101, a remote terminal r-UE 102, and a relay R-UE 103. The radio access network apparatus 101 includes a base station 1011. The remote terminal r-UE 102 includes a terminal receiving module 1021, a processing module 1022, and a sending module 1023. The relay R-UE 103 includes a receiving module 1031, a processing module 1032, and a sending module 1033.

The remote terminal receiving module 1021 is configured to receive, via an air interface, data sent from the base station module 1011 and/or the R-UE sending module 1033. The processing module 1022 of the remote terminal r-UE 102 is configured to autonomously select a communication path, a communication technology or a communication resource. The sending module 1023 of the terminal 102 is configured to send data and/or request information to the base station module 1011 or the R-UE receiving module. The base station module 1011 is configured to receive the data and/or request information from the terminal 102 and send data to the terminal r-UE102 and/or R-UE103.

Embodiment 7

This embodiment mainly describes an application scene where the above solution is mainly realized. In this application scene, wearables/MTC/NB-IOT device (r-UE) may send data to an eNB via a relay (R-UE), and receive information sent from the eNB via a Uu interface, wherein the relay communicates with the eNB via the Uu interface:

1) the r-UE receives control signaling via the Uu interface;
2) the r-UE measures channel quality of an interface and the Uu interface, and reports the channel quality to the eNB directly or via the R-UE;
3) the eNB sends communications link reselection/handover information to the r-UE;
4) the r-UE autonomously selects or selects a new R-UE based on an instruction of the eNB; and
5) the r-UE sends uplink data via the new R-UE.

This embodiment may realize service continuity of a remote UE. The demand for the service continuity of the remote UE is ensured by autonomously selecting or selecting based on the instruction of the eNB via the remote UE, the communication path or a communication technology between the remote UE and the relay.

Device Embodiments

In this embodiment there is further provided a communication apparatus for realizing service continuity, which is positioned in a remote user equipment r-UE. The apparatus is configured to implement the above embodiments and implementations, which have been described and thus are omitted here. As used below, the term "module" may implement software of predetermined functions and/or a combination of software and hardware. The apparatus described in the following embodiments is preferably implemented by software. However, implementation by combination of software and hardware also may be conceived.

Figure 11:
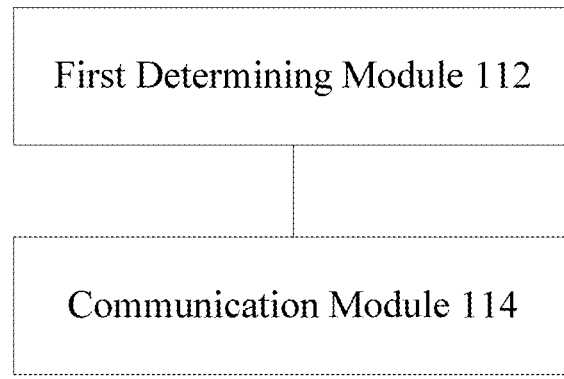
FIG. 11 is a structural block diagram of a communication apparatus for realizing service continuity according to an embodiment of the present disclosure.

FIG. 11 is a structural block diagram of a communication apparatus for realizing service continuity according to an embodiment of the present disclosure. As shown in FIG. 11, the apparatus includes:

a first determining module 112, configured to autonomously select or determine based on a first indication of an access network, a communication path communicating with the access network; and a communication module 114, connected to the first determining module 112 and configured to communicate with the access network by using the communication path.

Figure 12:
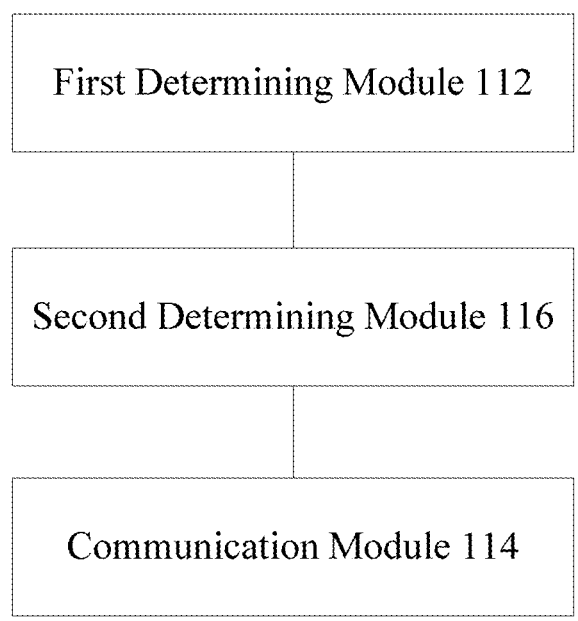
FIG. 12 is an structural block diagram of a communication apparatus for realizing service continuity according to an embodiment of the present disclosure.

FIG. 12 is an structural block diagram of a communication apparatus for realizing service continuity according to an embodiment of the present disclosure. As shown in FIG.

12, optionally, the communication path includes: communicating with the access network via an interface 3, wherein the interface 3 is configured to connect the r-UE to the access network via a relay user equipment R-UE, and the apparatus may further include:

a second determining module 116, connected to the first determining module 112 and the communication module 114 and configured to autonomously select or determine based on a second indication of the access network, a communication technology used for communicating between the r-UE and the R-UE.

Optionally, the R-UE may include at least one of: a layer 2 UE-to-network relay or a layer 3 UE-to-network relay.

Optionally, the r-UE may include at least one of: a conventional user equipment (UE), a wearable terminal, and an Internet of Things (IOT)/machine type communication (MTC) terminal.

Optionally, the access network includes a base station.

It is to be noted that the above modules may be implemented by means of software or hardware. The latter implementation means may be implemented in the following ways, but not limited thereto: all the above modules are positioned in the same processor; or the above modules are respectively positioned in different processors in any combination form.

An embodiment of the present disclosure further provides a storage medium. Optionally, in this embodiment, the foregoing storage medium may be configured to store program codes for performing following steps:

Step S202: autonomously selecting or determining based on a first indication of an access network, by a remote user equipment r-UE, a communication path communicating with the access network; and Step S204: communicating with the access network by the r-UE using the communication path.

Optionally, in this embodiment, the above storage medium may include but is not limited to: a USB flash disk, a read-only memory (ROM), a random access memory (RAM), a mobile hard disk, a magnetic disk or an optical disk and other media that may store program codes.

Optionally, reference may be made to examples as recited in the above embodiments and alternative embodiments for specific examples in this embodiment, which is not repeated any more herein.

Apparently, those skilled in the art should understand each of the foregoing modules or steps of the present disclosure may be realized with general computing devices, they may be concentrated on a single computing device, or distributed in a network constituted by a plurality of computing devices, optionally they may be realized with program codes executable by computing devices, thereby they may be stored in storage devices and executed by computing devices, and in some cases, the steps as shown or described may be performed in sequences different from the sequences herein, or they may be made into IC modules, or a plurality of modules or steps among them are made into a single IC module. In this way, the present disclosure is not limited to the combination of any specific hardware and software.

The above are merely embodiments of the present disclosure and are not intended to limit the present disclosure. To those skilled in the art, the present disclosure may have various modifications and changes. All modifications, equivalent substitutions and improvements made within the spirit and principle of the present disclosure shall fall within the protection scope of the present disclosure.

What is claimed is:

1. A communication method for realizing service continuity, the method being for a remote user equipment to reselect a communication link after a communication operation fails or to initially select a communication link, and comprising:

autonomously selecting, by the remote user equipment, a communication path communicating with the access network; and communicating with the access network by the remote user equipment using the communication path, wherein the communication path comprises at least one of:

communicating with the access network via a first interface, wherein the first interface is configured to directly connect the remote user equipment to the access network; and communicating with the access network via a second interface, wherein the second interface is configured to connect the remote user equipment to the access network via a relay user equipment;

wherein the autonomously selecting, by the remote user equipment, a communication path communicating with the access network means that the remote user equipment selects the first interface or the second interface based on a pre-configured rule to communicate with the access network;

wherein the pre-configured rule is stored in a universal integrated circuit card (UICC) or a mobility equipment (ME) of the remote user equipment, or is received from the access network via a system broadcast message; and wherein in a case that the communication path comprises communicating with the access network via the second interface, the method further comprises:

autonomously selecting or determining based on a second indication of the access network, by the remote user equipment, a communication technology used for communicating between the remote user equipment and the relay user equipment.

2. The method according to claim 1, wherein the communication technology comprises at least one of:
a 3GPP-based transmission technology; and
a non-3GPP-based transmission technology.

3. The method according to claim 2, wherein
the 3GPP-based transmission technology comprises: a device-to-device (D2D) technology; and/or
the non-3GPP-based transmission technology comprises at least one of: a Bluetooth technology, a WLAN/WiFi technology, an IrDA technology, a ZigBee technology, and other wireless communication technologies using an unlicensed frequency spectrum.

4. The method according to claim 1, wherein the autonomously selecting or determining based on a second indication of the access network, by the remote user equipment, a communication technology used for communicating between the remote user equipment and the relay user equipment comprises at least one of:

transferring, by the remote user equipment, a 3GPP technology originally used by the second interface into a non-3GPP technology for transmission;

transferring, by the remote user equipment, a non-3GPP technology originally used by the second interface into a 3GPP technology for transmission;

transferring, by the remote user equipment, a 3GPP technology originally used by the second interface into another 3GPP technology for transmission; and transferring, by the remote user equipment, a non-3GPP technology originally used by the second interface into another non-3GPP technology for transmission.

5. The method according to claim 1, wherein the autonomously selecting, by the remote user equipment, a communication path communicating with the access network comprises at least one of:
transferring, by the remote user equipment, all or a part of services transmitted originally via the first interface, into the second interface for transmission;
transferring, by the remote user equipment, all or a part of services transmitted originally via the second interface, into the first interface for transmission;
transferring, by the remote user equipment, all or a part of services transmitted originally via the first interface, into an interface directly connected to a target base station for transmission; and
transferring, by the remote user equipment, all or a part of services transmitted originally via the second interface, into an air interface connected to a target relay user equipment for transmission.

6. The method according to claim 1, wherein the relay user equipment comprises at least one of:
a layer 2 UE-to-network relay or a layer 3 UE-to-network relay.

7. The method according to claim 1, wherein
the first interface is a Uu interface; and/or
the second interface is an air interface between a remote user equipment and a relay user equipment.

8. The method according to claim 1, wherein the autonomously selecting, by the remote user equipment, a communication path communicating with the access network further comprises:
determining, by the remote user equipment, the communication path communicating with the access network based on at least one of:
link quality, quality of service (QoS) demand, power consumption demand, and access network indication information.

9. The method according to claim 8, wherein the pre-configured rule comprises at least one of:
priority of a communication path; link quality threshold of the communication path; and a resource configuration rule.

10. The method according to claim 8, wherein the access network indication information is indicative of at least one of:
communicating with the access network by simultaneously using a first interface and a second interface, wherein the first interface is configured to directly connect the remote user equipment to the access network, and the second interface is configured to connect the remote user equipment to the access network via a relay user equipment;
a service type of communication on the first interface and the second interface, wherein the service type comprises one of: QoS of a service, a control plane service, a user plane service, and an uplink or downlink service;
priority of the first interface and priority of the second interface;
detection resource and/or communication resource of the second interface; and
a 3GPP or non-3GPP technology used by the second interface.

11. The method according to claim 1, wherein the communicating with the access network by the remote user equipment using the communication path comprises at least one of:
uplink control plane (CP) communication;
uplink user plane (UP) communication;
downlink CP communication; and
downlink UP communication.

12. The method according to claim 1, wherein the second indication is a system message or a specific instruction indicative of a communications technology, and wherein the specific instruction comprises at least one of: layer 1 signaling, layer 2 signaling, and layer 3 signaling.

13. The method according to claim 1, wherein
the first interface and the second interface are of intra-frequency or inter-frequency; and/or
the second interface uses a licensed frequency spectrum or an unlicensed frequency spectrum.

14. The method according to claim 1, wherein the remote user equipment is positioned within or beyond a coverage range of the access network, or the remote user equipment is positioned within an enhanced coverage range of the access network; and the relay user equipment is positioned within the coverage range of the access network.

15. A communication apparatus for realizing service continuity, the communication apparatus being for a remote user equipment to reselect a communication link after a communication operation fails or to initially select a communication link, being positioned in the remote user equipment, and comprising:
a processor; and
a memory configured to store instructions executable by the processor; wherein the processor is configured to perform:
autonomously selecting, by the remote user equipment, a communication path communicating with the access network; and
communicating with the access network by the remote user equipment using the communication path,
wherein the communication path comprises at least one of:
communicating with the access network via a first interface, wherein the first interface is configured to directly connect the remote user equipment to the access network; and
communicating with the access network via a second interface, wherein the second interface is configured to connect the remote user equipment to the access network via a relay user equipment;
wherein the autonomously selecting, by the remote user equipment, a communication path communicating with the access network means that the remote user equipment selects the first interface or the second interface based on a pre-configured rule to communicate with the access network;
wherein the pre-configured rule is stored in a universal integrated circuit card (UICC) or a mobility equipment (ME) of the remote user equipment, or is received from the access network via a system broadcast message; and
wherein in a case that the communication path comprises communicating with the access network via the second interface, the processor is further configured to perform:
autonomously selecting or determining based on a second indication of the access network, by the remote user equipment, a communication technology used for communicating between the remote user equipment and the relay user equipment.

16. A non-transitory computer-readable storage medium storing a computer-executable instruction, wherein the computer-executable instruction is configured to execute a communication method for realizing service continuity, the method being for a remote user equipment to reselect a communication link after a communication operation fails or to initially select a communication link, and comprising:
   autonomously selecting, by the remote user equipment, a communication path communicating with the access network; and
   communicating with the access network by the remote user equipment using the communication path,
   wherein the communication path comprises at least one of:
      communicating with the access network via a first interface, wherein the first interface is configured to directly connect the remote user equipment to the access network; and
      communicating with the access network via a second interface, wherein the second interface is configured to connect the remote user equipment to the access network via a relay user equipment;
   wherein the autonomously selecting, by the remote user equipment, a communication path communicating with the access network means that the remote user equipment selects the first interface or the second interface based on a pre-configured rule to communicate with the access network;
   wherein the pre-configured rule is stored in a universal integrated circuit card (UICC) or a mobility equipment (ME) of the remote user equipment, or is received from the access network via a system broadcast message;
   wherein in a case that the communication path comprises communicating with the access network via the second interface, the method further comprises:
      autonomously selecting or determining based on a second indication of the access network, by the remote user equipment, a communication technology used for communicating between the remote user equipment and the relay user equipment.

* * * * *